United States Patent
Hegde

(10) Patent No.: US 11,501,882 B2
(45) Date of Patent: Nov. 15, 2022

(54) SPREADSHEET TEMPLATE CONTROL OF DATA FLOW AND PROCESSING

(71) Applicant: LogicMatter, Inc., Seattle, WA (US)

(72) Inventor: Kiran V. Hegde, Sammamish, WA (US)

(73) Assignee: LOGICMATTER, INC., Seattle, WA (US)

(*) Notice: Subject to any disclaimer, the term of this patent is extended or adjusted under 35 U.S.C. 154(b) by 0 days.

(21) Appl. No.: 17/084,566

(22) Filed: Oct. 29, 2020

(65) Prior Publication Data
US 2021/0050119 A1 Feb. 18, 2021

Related U.S. Application Data

(63) Continuation of application No. 16/669,329, filed on Oct. 30, 2019.
(Continued)

(51) Int. Cl.
| | |
|---|---|
| *H04L 12/00* | (2006.01) |
| *G16Y 40/35* | (2020.01) |
| *G16Y 40/50* | (2020.01) |
| *G16Y 40/60* | (2020.01) |
| *G06F 16/18* | (2019.01) |
| *G08B 21/18* | (2006.01) |
| *H04L 67/12* | (2022.01) |
| *H04L 9/06* | (2006.01) |
| *H04L 9/00* | (2022.01) |

(52) U.S. Cl.
CPC .......... *G16Y 40/35* (2020.01); *G06F 16/1805* (2019.01); *G08B 21/18* (2013.01); *G16Y 40/50* (2020.01); *G16Y 40/60* (2020.01); *H04L 9/0643* (2013.01); *H04L 67/12* (2013.01); *H04L 9/50* (2022.05)

(58) Field of Classification Search
CPC . H04L 67/12; H04L 2209/38; H04L 67/2823; H04L 67/20; H04L 9/0643; H04L 9/3239; H04W 4/70; G16Y 40/60; G16Y 40/35; G16Y 40/50; G06F 16/1805; G08B 21/18
USPC ....................................... 709/217, 218, 219
See application file for complete search history.

(56) References Cited

U.S. PATENT DOCUMENTS 5,033,009 A * 7/1991 Dubnoff ................ G06F 40/174
715/205
7,096,082 B1 * 8/2006 Connelly ........... G06Q 10/0635
700/97
(Continued)

*Primary Examiner* — Frantz Coby

(57) ABSTRACT

A spreadsheet template control of data flow and process for moving and retrieving between at least one source node/device and at least one target node/device in a network environment, is disclosed herein. At least one metadata definition an at least one processing rule can be retrieved from an import process spreadsheet file in order to thereby pull/receive a data element from at least one source node/device in an enterprise network environment. Further, at least one metadata and at least one rule can be retrieved from a transform process spreadsheet file in order to thereby covert, cleanse and collate the data element into a data store of transformed data. Finally, at least one metadata and at least one rule is retrieved from an export process spreadsheet file for pushing the transformed data into at least one target node/device in the network environment.

8 Claims, 4 Drawing Sheets

Related U.S. Application Data

(60) Provisional application No. 62/752,827, filed on Oct. 30, 2018.

(56) References Cited

U.S. PATENT DOCUMENTS

| | | | | |
|---|---|---|---|---|
| 7,487,437 | B2* | 2/2009 | Aureglia | G06F 40/18 |
| | | | | 715/212 |
| 7,533,118 | B2* | 5/2009 | Chaudri | G06F 16/86 |
| 8,631,456 | B2* | 1/2014 | Reisman | H04N 21/858 |
| | | | | 725/113 |
| 8,791,769 | B2* | 7/2014 | Leong | H01P 5/10 |
| | | | | 333/25 |
| 9,411,864 | B2* | 8/2016 | Glider | G06F 40/151 |
| 9,667,641 | B2* | 5/2017 | Muddu | G06F 40/134 |
| 10,108,683 | B2* | 10/2018 | Dhayapule | G06F 16/84 |
| 2006/0156221 | A1* | 7/2006 | Chen | G06F 40/154 |
| | | | | 715/209 |
| 2007/0133522 | A1* | 6/2007 | Morgan | H04L 43/06 |
| | | | | 370/352 |
| 2014/0108903 | A1* | 4/2014 | Tai | G06F 40/18 |
| | | | | 715/212 |
| 2014/0164895 | A1* | 6/2014 | Matheson | G06F 40/18 |
| | | | | 715/212 |
| 2014/0173401 | A1* | 6/2014 | Oshlag | G06F 40/18 |
| | | | | 715/212 |
| 2018/0322168 | A1* | 11/2018 | Levine | G06F 16/2471 |
| 2020/0026710 | A1* | 1/2020 | Przada | G06N 20/00 |
| 2020/0073987 | A1* | 3/2020 | Perumala | G06F 16/24545 |
| 2020/0077892 | A1* | 3/2020 | Tran | G16H 40/67 |

* cited by examiner

SPREADSHEET TEMPLATE CONTROL OF DATA FLOW AND PROCESSING

TECHNICAL FIELD

Embodiments are generally related to data processing systems and processes. Embodiments are further related to big data management systems and approaches. Embodiments are also related to systems and processes for moving and sharing data between a source node/device and a target node/device in a network environment. Embodiments are particularly related to a data processing system and Extract Load and Transform (ETL) process for moving and retrieving between at least one source node/device and at least one target node/device in a network environment.

BACKGROUND OF THE INVENTION

With the increased growth in information technology and advanced ETL data processing systems, data management systems and processes grow more complex and have more users interacting with them, and issues such as ETL logic transparency, performance, error processing, exception handling, data integrity, ETL configuration, work-load management, batch processing, efficiency, data stream manipulation between source to target and continuous availability of any changes in any logic that computes the import, transform and/or export data between two devices in a network within a data processing system network environment need to be solved.

Systems and methods for handling data within an enterprise is well-known in the art. Such prior art ETL solutions are only able to render limited solutions for effective handling of data in the business enterprises due to their dependencies on developing specialized program logic to extract (E), load (L) and transform (T) data between a source and a target system. The prior art systems can only handle data processing events that are orchestrated and defined during the design and implementation and have fixed configurations for a given data processing activity, offer little or no expansion capabilities during runtime and frequently require manual intervention and at many times a redeployment and re-implementation of the ETL package to process data through the system.

In addition, the mechanisms for maintaining the logic that is in these ETL solutions that perform data processing and data integrity management are either limited in capability or are a blackbox of computation that are unable to expose a declarative format to clearly determine the logic that contributed to a specific event and/or specific change in data. With the growing presence of distributed computing, and the increased need for sharing large amounts of data across an enterprise, a ETL solution is required to address these problems and ensures exposing clearly in a declarative and easy to understand format what led to the transformation of data from source to target in a business enterprise.

The modern business enterprises, in particular, the Information Technology (IT) departments are dependent on various IT solutions or devices to deal with their business problems. Such large dependency on IT solutions and devices by the business enterprises have invited several types of ETL solutions with layers of data management within the enterprise making it extremely difficult of IT departments to determine with clarity the specific transformations and changes in data between source and target systems in an effective and consistent manner.

Furthermore, the cost of integrating various solutions, applications and devices in such complex network environment has become tedious and time-consuming process as different ETL solutions/applications use different methods to expose their transformation logic, events, and data processing tasks. Additionally with many different APIs and methods becoming the norm of the cloud and the mobile era the task of determining what logic contributed to what change in a data or event in an ETL becomes very costly to resolve as it is dependent on many resources who have to share part of their knowledge to collectively determine the cause for the state of the data and/or event. Typically, in such enterprise network environments, a business user is exposed to different application specific approaches to determine the reason for the state of the data, but has no visibility into the ETL logic that may have contributed to this state of data during the import, transform, export, configure and/pr process task of data processing.

Traditionally, ETL (Extract, Transform and Load) tools are used with tightly coupling between the source node and the target node in the network environment without any midpoint ETL logic exposed to the analysts or business users to intervene, review, analyze, configure and manipulate to influence change in the data flow. When one reviews the prior art, one will certainly find, data management systems which provide means for handling and sharing ETL logic events, exceptions, status and configurations to solutions, devices and application in a data system to facilitate the change of state of data between source and target systems thereof. However, such prior art data processing systems are insufficient and lacking because they fail to address an effective solution for exposing all aspects of ETL data processing logic between a source node and a target node for business users to efficiently manage the change required and/or response needed and/or decision making information needed to understand what caused the ETL logic to produce the state change of data and/or specific event in the enterprise environment.

Based on the foregoing a need therefore exists for an improved ETL data processing system and process for handling the solutions, applications, and devices within a business enterprise ecosystem. A need also exists to utilize well understood tools business user tools such as Spreadsheets to become the declarative templates and deliver the ETL instruction that dynamically generate ETL data processing between any two systems, devices and network nodes.

SUMMARY OF THE INVENTION

The following summary is provided to facilitate a clear understanding of the new features in the disclosed embodiment and it is not intended to be a full, detailed description. A detailed description of all the aspects of the disclosed invention can be understood by reviewing the full specification, the drawing, and the claims and the abstract, as a whole.

One objective of the present invention relates to provide an improved data processing system and process for handling a wide range of ETL solutions and devices across a business enterprise ecosystem.

Another objective of the present invention relates to provide an improved system and process for moving and sharing data between at least one source node and at least one target node within a network environment.

Further objective of the present invention is to provide an improved data processing system for defining a declarative Spreadsheet based instruction for any process to copy, move, augment, validate, convert, transform, filter, order, retrieve, publish and process between at least one source node/device and at least one target node/device in a network environment.

There are several advantages over current ETL processes where the instructions and the logic for ETL are not visible, whereas using the Spreadsheet templates for defining metadata and declarative instructions in import, transform and export templates for interpretation all by any data processing tasks and understandable by any human data analyst is a key element of such a system herein.

The aforementioned aspects along with the objectives and the advantages can be achieved as described herein. A spreadsheet template can provide any process the instructions needed to dynamically control the data processing tasks between at least one source node/device and at least one target node/device in a network environment, as disclosed herein. At least one metadata definition an at least one processing rule can be retrieved from an import process template interpreted by any importer task to operate on any data element from at least one source node/device in an enterprise network environment.

Further, at least one declarative definition of metadata and at least one rule can be defined in transform template interpreted by any a transformer task to provide covert, validate, move, copy, cleanse, lookup, augment, transpose, aggregate, organize and collate the data element into a data store of transformed data.

Finally, at least one metadata and at least one rule is retrieved from an export template that contains metadata definition, declarative definitions and instructions to copy, move, process, filter, trigger, order and ingest data that can be interpreted by any export task between at least one source and one target node/device in the network environment.

The data processing system proposed herein thereby provide a human readable, machine interpretable cost effective and simple Spreadsheet based import, transform and export template to effectively handle any ELT or ETL f data flow and data processing tasks between at least one source node/device and at least one target node/device in the enterprise network environment.

The processing system proposed herein enables a business user in the environment with only Spreadsheet or Excel skills to define, monitor and handle all aspects of the data flow and data processing device nodes in any network environment without any need to learn multiple ETL scripts or programming methods to interface with different application interfaces in the business ecosystem. The data flow and processing system in association with the data interpreters that are responsible for executing the tasks at hand thereby reducing the complexity of defining ETL tasks to copy, move, transform and process data between different applications on least one source node/device and at least one target node/device from diverse systems.

The system further enables the business user to get notified, access all aspects of the data flow, data processing, Spreadsheet template versions, and any errors or exceptions to be available for reporting directly from a centralized data lake or data warehouse.

There are four key usage scenarios and perhaps others that this system and method can be very effective in a connected world of microservices, cloud applications and API endpoints, herein. (1) Collating CSV and other text data from multiple diverse source nodes/devices into a single target node/device or data lake or datahub or database. (2) Migrate data records for dimensions and facts from one format into another format between two business solutions with similar use but running with different products or versions) ERPs, CRMs, etc). (3) To collate data from various departmental applications such as HR, Finance, MRP, Sales/CRM, Operations, etc source nodes/devices to copy and transform data into a well-organized data warehouse of subject areas, dimensions and facts that enable business users to query 360 degree views on topic of analysis. (4) The system also enables the business user to publish and feed data from multiple internal source nodes/devices to external single or multiple target mode/devices.

In an exemplary embodiment, the data interpreters can use spreadsheet templates for instructions to execute data flow and processing instructions between at least one source node/device and at least one target node/device in the network environment.

The templates provided can be parsed to interpret instructions and logic needed to process data through key stages, including but not limited to an importation stage, a transformation stage and an exportation stage of the data movement between at least one source node/device and at least one target node/device in the network environment. Note that the data flow stages described herein should not be constituted any limited sense. The proposed invention enables the business users in the network environment to manipulate and/or alter the data flow between the source node and target node making it lot more flexible to move and share data between applications and provide full visibility into a declarative form of data processing logic that gives full exposure to why and how success or failures occur in the movement of data from source to target.

BRIEF DESCRIPTION OF DRAWINGS

The drawings shown here are for illustration purpose and the actual system will not be limited by the size, shape, and arrangement of components or number of components represented in the drawings.

DETAILED DESCRIPTION

The principles of operation, design configurations and evaluation values in these non-limiting examples can be varied and are merely cited to illustrate at least one embodiment of the invention, without limiting the scope thereof.

The embodiments will be described in detail with corresponding marked references to the drawings, in which the illustrative components of the invention are outlined. The embodiments disclosed herein can be expressed in different forms and should not be considered as limited to the listed embodiments in the disclosed invention. The various embodiments outlined in the subsequent sections are construed such that it provides a complete and a thorough understanding of the disclosed invention, by clearly describing the scope of the invention, for those skilled in the art.

Figure 1:
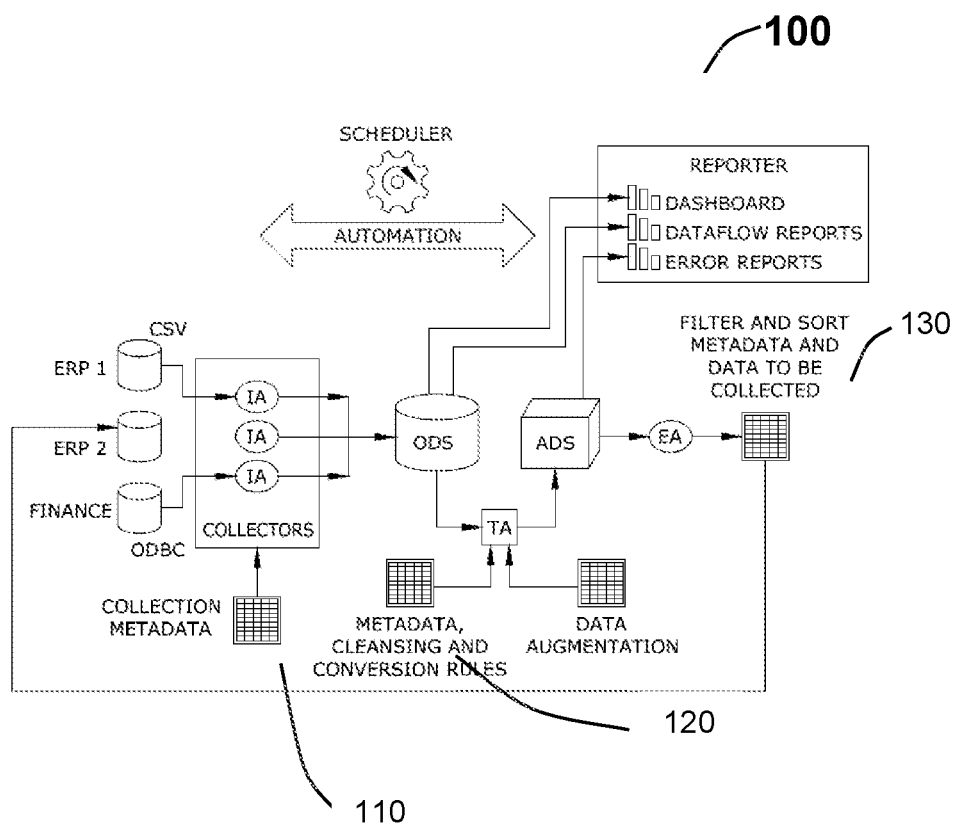
FIG. 1 illustrates a graphical representation of data processing system for moving and retrieving between at least one source node/device and at least one target node/device in a network environment, in accordance with the disclosed embodiments.

FIG. 1 illustrates a graphical representation of data processing system 100 for data flow and data processing between at least one source node/device and at least one target node/device in a network environment using spreadsheet import, transform and export templates that define the metadata, rules and declarative instructions for processes that interpret and create the logic for moving and retrieving the data, in accordance with the disclosed embodiments. At least one metadata definition and at least one processing rule can be retrieved from an import template by a process interpreter in order to thereby pull or subscribe or receive a data element from at least one source node/device in an enterprise network environment, as disclosed in block 110. Further, at least one metadata and at least one processing rule can be retrieved from a transform template b a process interpreter in order to thereby covert, cleanse, transpose, augment, validate, ingest, transform, aggregate and collate the data element into a data store of transformed data, as disclosed at block 120. Finally, at least one metadata and at least one processing rule is retrieved from an export template by a process interpreter in order to retrieve, copy and move, filter and order data from transformed source into at least one target node/device in the network environment, as disclosed at block 130.

Figure 2:
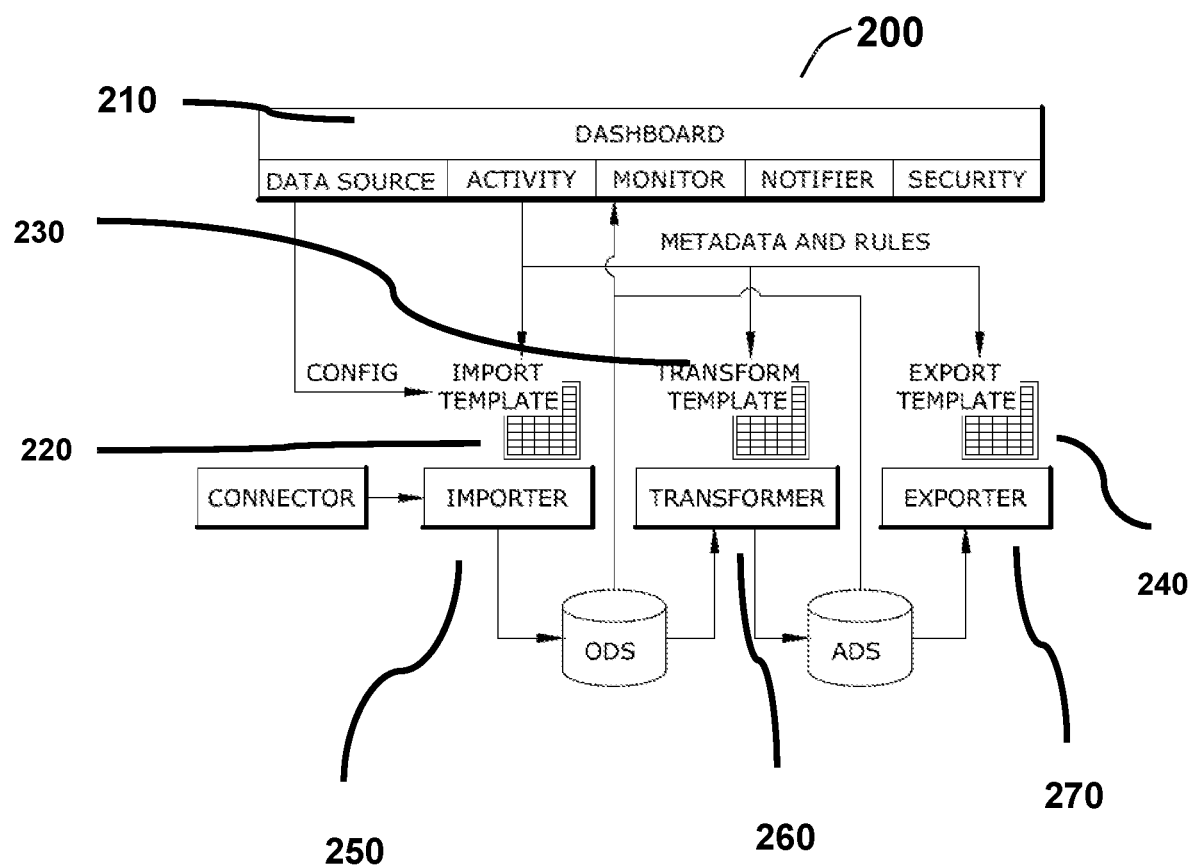
FIG. 2 illustrates another graphical representation of data processing system for moving and retrieving between at least one source node/device and at least one target node/device in a network environment representing a dashboard and flow of metadata and rules, in accordance with the disclosed embodiments.

FIG. 2 illustrates another graphical representation 200 of the data processing system representing a dashboard block as shown in 210, which is the user interface for the business user to access data flow and processing, and add or edit the metadata, processing rules and declarative instructions in three Spreadsheet templates, as shown the import template in block 220, the transform template as in block 230 and the export template as in block 240, necessary for an importer process as in block 250, the transformer process block 260 and/or exporter process block 270 to interpret and execute the definitions in the templates to manipulate and manage the data flow and data process between at least one source node/device and at least one target node/device in a network environment, in accordance with the disclosed embodiments.

The system Dashboard interface in FIG. 2. shown in block 210 further enables the business user to monitor and report on the status of the data flow and data processing from a centralized user interface. A centralized dashboard helps the business users to track, analyse, get notified, secure and monitor the data flow across the business environment and thereby enable effective handling data elements in the network environment.

A business user creates a new data source with a unique identity a datasource to connect a source to pull from or a target to push data to from any application in the ecosystem. The business user enters the necessary connection information and verifies the connection to setup the pipeline for flowing data from the source or sending data to the target, respectively. The business user creates activities to define flow tasks on an ad hoc basis and/or periodic schedules to connect to the data source identities to process and flow data from source to ODS, from ODS to ADS and from ADS to any target end points.

Figure 3:
FIG. 3 illustrates a graphical representation of an exemplary data interpreter (spreadsheet) template used in the data processing system for moving and retrieving between at least one source node/device and at least one target node/device in a network environment, in accordance with the disclosed embodiments.

FIG. 3 illustrates a graphical representation of an exemplary data interpreter (spreadsheet) template 300 used in the data processing system for moving and retrieving between at least one source node/device and at least one target node/device in a network environment, in accordance with the disclosed embodiments. In an exemplary embodiment, the templates can have several sheets of declarative definitions for data interpreter to process tasks that interpret the configurations, metadata, rules, definitions and/or errors to manage data flow from at least one source node/device and at least one target node/device in the network environment.

Figure 4:
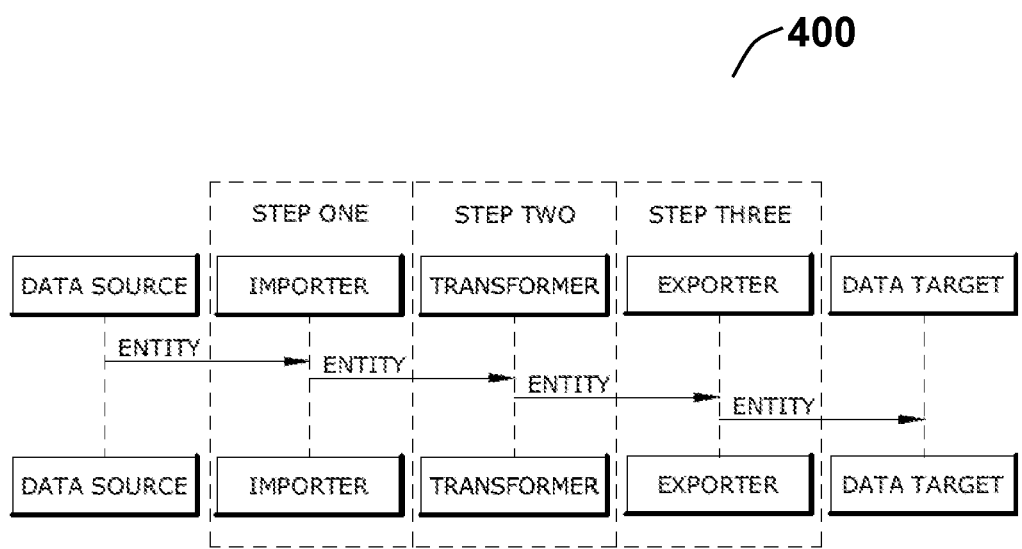
FIG. 4 illustrates an exemplary workflow diagram representing data flow in the data processing system for moving and retrieving between at least one source node/device and at least one target node/device in a network environment, in accordance with the disclosed embodiments.

FIG. 4 illustrates an exemplary workflow diagram 400 representing data flow in the data processing system for moving and retrieving between at least one source node/device and at least one target node/device in a network environment, in accordance with the disclosed embodiments. In an exemplary embodiment, a process of the subject technology uses three steps (Import, Transform and Export) using spreadsheet templates which an analyst can easily define in a consistent and familiar way all aspects of managing the data movement between various applications without having to learn specific the APIs, UIs and/or proprietary methods to import/export data from various applications.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

It will be appreciated that variations of the above-disclosed and other features and functions, or alternatives thereof, may be desirably combined into many other different systems or applications. Also, that various presently unforeseen or unanticipated alternatives, modifications, variations, or improvements therein may be subsequently made by those skilled in the art which are also intended to be encompassed by the following claims.

I claim:

1. A process for moving and retrieving data between at least one source node and at least one target node in a network environment, said process comprising:

retrieving at least one metadata definition and at least one declarative instruction from an import template spreadsheet file by a data interpreter in order to pull or receive a data element from at least one source node in a network environment;

retrieving at least one metadata definition and at least one declarative instruction from a transform template spreadsheet file by a data interpreter in order to covert, cleanse, validate, augment, operate, aggregate, compute, transpose or collate the data element into transformed data; and retrieving at least one metadata definition and at least one declarative instruction from an export template spreadsheet file by a data interpreter for pushing, filtering, or sorting the transformed data into at least one target node in the network environment.

2. The process of claim 1 further comprising:

using a spreadsheet based template for an import, transform and export task comprising at least one declarative instruction for a data interpreter to facilitate moving data between different applications and their interfaces on at least one source node and at least one target node.

3. The process of claim 1 further comprising:

using three distinct spreadsheet templates for the import template spreadsheet file, the transform template spreadsheet file and the export template spreadsheet file to control the data flow from a source node to a target node.

4. The process of claim 1 further comprising:

using a data interpreter that interprets a metadata definition and at least one declarative instruction, present in at least one cloud based spreadsheet import, transform, or export template file to process data elements between different systems and to migrate data from one system to another system on a network.

5. The process of claim 1 further comprising:

using a data interpreter to access text and comma separated values (CSV) data from multiple systems and locations to collate the text and data in a centralized database.

6. The process of claim 1 further comprising:

using a centralized 360-degree view of analysis from data in various departmental databases to produce a dashboard for tracking, analyzing, or monitoring a business environment.

7. The process of claim 1 further comprising:

using a data interpreter that interprets a metadata definition and at least one declarative instruction present in a single cloud based spreadsheet import, transform and export template file to flow data from at least one source node and at least one target node in the network environment.

8. The process of claim 1 further comprising:

manipulating the data flow between the source node and target node in order to make facilitate moving and sharing data between applications in the network environment.

* * * * *